US012662604B2

(12) United States Patent
Youn et al.

(10) Patent No.: US 12,662,604 B2
(45) Date of Patent: Jun. 23, 2026

(54) INK COMPOSITION, FILM USING THE SAME, AND ELECTROPHORETIC DISPLAY DEVICE

(71) Applicant: Samsung Display Co., LTD., Yongin-si (KR)

(72) Inventors: Jinsuop Youn, Suwon-si (KR); Minjun Kim, Suwon-si (KR); Bongyong Kim, Suwon-si (KR); YoungMin Kim, Suwon-si (KR); Young Woo Park, Suwon-si (KR); Chuljin Park, Suwon-si (KR); Jeongwoo Lee, Suwon-si (KR); Young Woong Jang, Suwon-si (KR); Hyunmoo Choi, Suwon-si (KR); Misun Kim, Suwon-si (KR); Janghyuk Kim, Suwon-si (KR); Heeje Woo, Suwon-si (KR); Eunsun Yu, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/732,801

(22) Filed: Jun. 4, 2024

(65) Prior Publication Data

US 2025/0026948 A1 Jan. 23, 2025

(30) Foreign Application Priority Data

Jul. 13, 2023 (KR) ........................ 10-2023-0091248

(51) Int. Cl.
*C09D 11/52* (2014.01)
*C09D 11/033* (2014.01)
(Continued)

(52) U.S. Cl.
CPC ............ *C09D 11/52* (2013.01); *C09D 11/033* (2013.01); *C09D 11/037* (2013.01);
(Continued)

(58) Field of Classification Search
CPC ........ C08K 3/013; C09D 11/36; C09D 11/38; C09D 11/037; C09D 11/033; C09D 11/52; G02F 1/13439
(Continued)

(56) References Cited

U.S. PATENT DOCUMENTS

2006/0110896 A1* 5/2006 Kobayashi ........... C09K 11/883
438/483
2014/0048749 A1* 2/2014 Lockett ................ C09D 11/033
252/500

FOREIGN PATENT DOCUMENTS

CN 105062218 A 11/2015
KR 10-958920 5/2010
(Continued)

OTHER PUBLICATIONS

Translation of WO-2022092556-A1 (Year: 2022).*

*Primary Examiner* — Tri V Nguyen
(74) *Attorney, Agent, or Firm* — Womble Bond Dickinson (US) LLP

(57) ABSTRACT

Embodiments provide an ink composition, a film manufactured using the ink composition, and an electrophoretic display device including the film. The ink composition includes (A) a semiconductor nanorod, and (B) a dispersion medium, wherein the dispersion medium includes: (B1) a compound which has a viscosity at 25° C. of 70 cps or less and has a dielectric constant of 5 or more; (B2) a compound which has a viscosity at 25° C. of 80 cps or more or is a solid and has a dielectric constant of 5 or more; (B3) a compound which has a viscosity at 25° C. of 20 cps or more or is a solid and has a dielectric constant of less than 5; and (B4) a compound which has a viscosity at 25° C. of 12 cps or less or is a solid and has a dielectric constant of 4 to 7.5.

20 Claims, 1 Drawing Sheet

(51) Int. Cl.
*C09D 11/037* (2014.01)
*G02F 1/1343* (2006.01)
*G02F 1/167* (2019.01)
*G02F 1/1676* (2019.01)

(52) U.S. Cl.
CPC .......... *G02F 1/13439* (2013.01); *G02F 1/167* (2013.01); *G02F 1/1676* (2019.01)

(58) Field of Classification Search
USPC ........................................................ 252/519.3
See application file for complete search history.

(56) References Cited

FOREIGN PATENT DOCUMENTS

| | | | | |
|---|---|---|---|---|
| KR | 10-2021-0114761 | | 9/2021 | |
| KR | 10-2021-0132279 | | 11/2021 | |
| KR | 10-2021-0133044 | | 11/2021 | |
| KR | 10-2022-0022518 | | 2/2022 | |
| KR | 10-2022-0090666 | | 6/2022 | |
| KR | 10-2022-0153489 | A | 11/2022 | |
| KR | 10-2023-0133261 | | 9/2023 | |
| WO | 2008-093663 | | 8/2008 | |
| WO | WO-2022092556 | A1 * | 5/2022 | ........... C08G 75/045 |

* cited by examiner

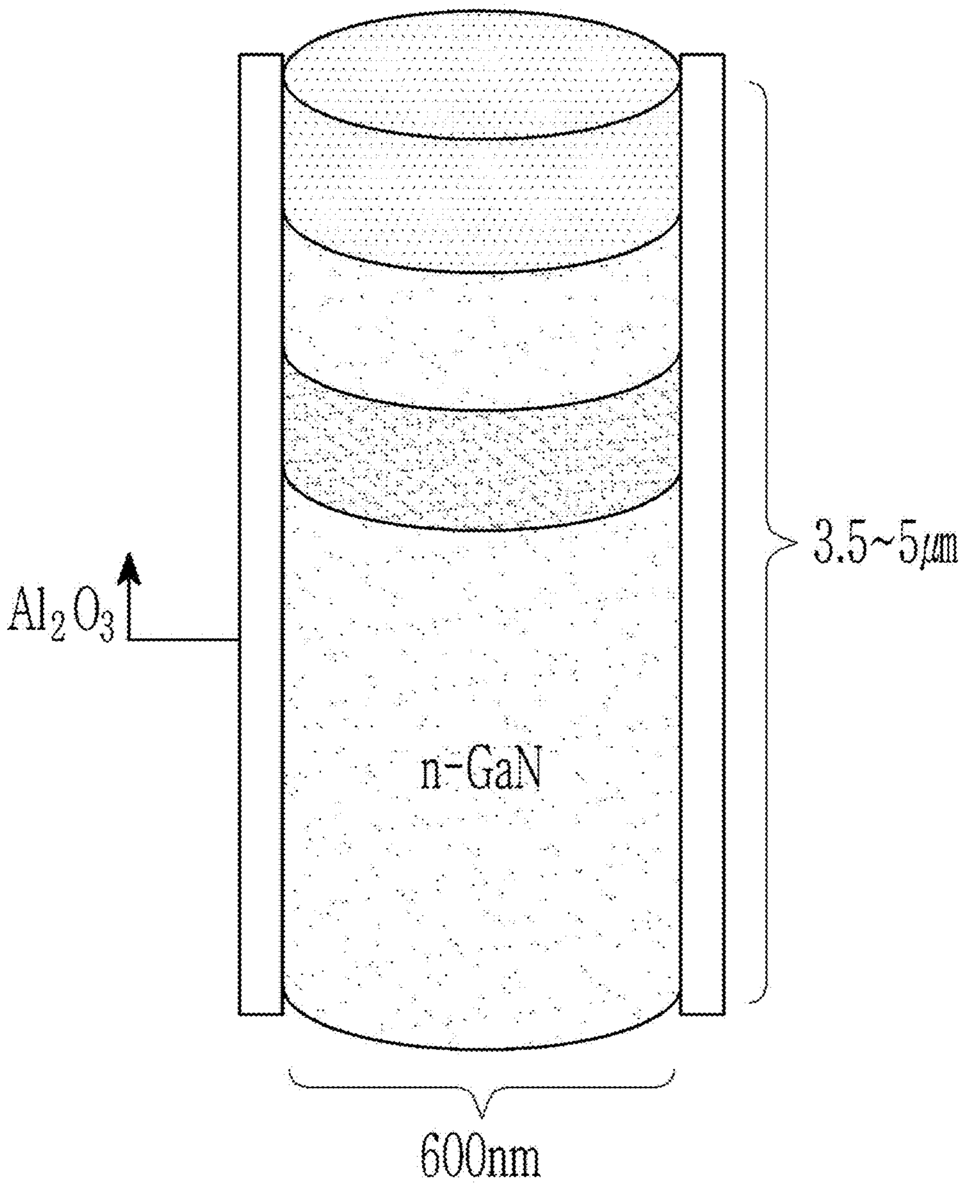
Al2O3
3.5~5μm
n-GaN
600nm

INK COMPOSITION, FILM USING THE SAME, AND ELECTROPHORETIC DISPLAY DEVICE

CROSS-REFERENCE TO RELATED APPLICATION(S)

This application claims priority to and benefits of Korean Patent Application No. 10-2023-0091248 under 35 U.S.C. § 119, filed on Jul. 13, 2023 in the Korean Intellectual Property Office, the entire contents of which are incorporated herein by reference.

BACKGROUND

1. Technical Field

The disclosure relates to an ink composition, a film using the same, and an electrophoretic display device.

2. Description of the Related Art

Light emitting diodes (LEDs) have been actively developed since 1992 when Nakamura and others from the Japanese company Nichia Corporation succeeded in fusing a good quality single-crystal GaN nitride semiconductor by applying a GaN compound buffer layer at low temperature. An LED is a semiconductor that converts electrical signals into light having a wavelength band in a desired region by using the properties of a compound semiconductor, which has a structure in which a n-type semiconductor crystal including carriers as electrons and a p-type semiconductor crystal including carriers as holes are combined to each other.

Since the LED semiconductor has high light conversion efficiency, its energy consumption is very low, its lifespan is semi-permanent, it is environmentally friendly, and thus, it is called a revolution of light as a green material. With the advancement of compound semiconductor technology, active development continues for high-brightness red, orange, green, blue, and white LEDs, and LEDs are being applied to various fields such as traffic lights, mobile phones, car headlights, outdoor electronic signs, LCD back light unit (BLU), and indoor/outdoor lighting. For example, a GaN-based compound semiconductor having a large band gap is a material used in manufacture of a LED semiconductor which emits light in green, blue, and ultraviolet regions, and since a white LED may be manufactured using a blue LED, GaN-based compound semiconductor is being actively studied.

Among a series of studies, studies using an ultra-small LED having a nano or micro unit size are being actively conducted, and studies for using ultra-small LEDs in lightings, displays, and the like are continuously made.

In these studies, an electrode capable of applying power to the ultra-small LED devices, an electrode arrangement for reducing a space occupied by the electrodes, a method of mounting the ultra-small LEDs on the arranged electrodes, and the like are continuously attracting attention.

Among them, a method of mounting the ultra-small LEDs on the arranged electrodes still has a great difficulty in arranging and mounting an ultra-small LED as intended due to the size limitation of ultra-small LEDs. The ultra-small LEDs are a nano-scale or micro-scale, and thus they may not be arranged and mounted on the intended electrode area individually by hand.

Recently, as demand for nano-scale ultra-small LEDs continues to grow, and there have been attempts to manufacture a nano-scale GaN-based compound semiconductor or InGaN-based compound semiconductor into a rod. However, a nanorod itself has significantly reduced dispersion stability in a solvent (or polymerizable compound). Further, there has been no material for the technology which may improve dispersity stability in the solvent (or polymerizable compound) of a semiconductor nanorod. Therefore, research on a semiconductor nanorod-containing ink composition which may improve dispersion stability in the solvent (or polymerizable compound) of the semiconductor nanorod and a dielectrophoretic rate continues.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments provide an ink composition which may have excellent electrophoretic properties of a semiconductor nanorod and which may have a viscosity at which inkjet process is allowed at room temperature (20° C. to 25° C.).

Embodiments also provide a film manufactured using the ink composition.

Embodiments also provide an electrophoretic display device including the film.

An embodiment provides an ink composition which may include (A) a semiconductor nanorod; and (B) a dispersion medium, wherein the dispersion medium may include:

(B1) a compound which has a viscosity at 25° C. equal to or less than about 70 cps and has a dielectric constant equal to or greater than about 5; (B2) a compound which has a viscosity at 25° C. equal to or greater than about 80 cps or is a solid and has a dielectric constant equal to or greater than about 5; (B3) a compound which has a viscosity at 25° C. equal to or greater than about 20 cps or is a solid and has a dielectric constant of less than about 5; and (B4) a compound which has a viscosity at 25° C. equal to or less than about 12 cps or is a solid and has a dielectric constant in a range of about 4 to about 7.5.

In an embodiment, the dispersion medium may include, with respect to a total amount of the dispersion medium: about 10 wt % to about 30 wt % of (B1) the compound which has a viscosity at 25° C. equal to or less than about 70 cps and has a dielectric constant equal to or greater than about 5; about 20 wt % to about 40 wt % of (B2) the compound which has a viscosity at 25° C. equal to or greater than about 80 cps or is a solid and has a dielectric constant equal to or greater than about 5; about 10 wt % to about 30 wt % of (B3) the compound which has a viscosity at 25° C. equal to or greater than about 20 cps or is a solid and has a dielectric constant of less than about 5; and about 20 wt % to about 50 wt % of (B4) the compound which has a viscosity at 25° C. equal to or less than about 12 cps or is a solid and has a dielectric constant in a range of about 4 to about 7.5.

In an embodiment, (B1) the compound which has a viscosity at 25° C. equal to or less than about 70 cps and has a dielectric constant equal to or greater than about 5 may have a viscosity at 50° C. equal to or less than about 50 cps.

In an embodiment, (B1) the compound which has a viscosity at 25° C. equal to or less than about 70 cps and has a dielectric constant equal to or greater than about 5 may include a compound represented by any one of Formulae 1-1 to 1-5:

[Formula 1-1]

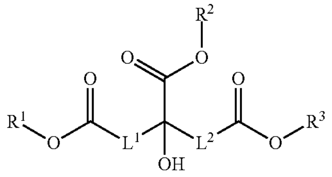

[Formula 1-2]

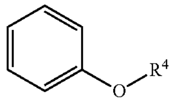

[Formula 1-3]

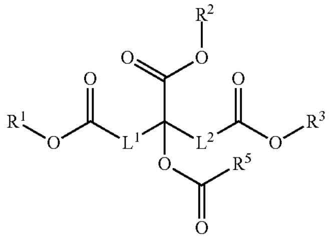

[Formula 1-4]

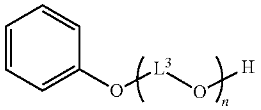

[Formula 1-5]

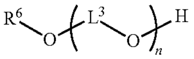

In Formulae 1-1 to 1-5, $R^1$ to $R^3$ and $R^6$ may each independently be a substituted or unsubstituted C1 to C20 alkyl group, $R^4$ may be a C1 to C20 alkyl group substituted with a hydroxyl group, $R^5$ may be a substituted or unsubstituted C2 to C20 alkyl group, $L^1$ to $L^3$ may each independently be a substituted or unsubstituted C1 to C20 alkylene group, and n may be an integer from 1 to 10.

In an embodiment, (B2) the compound which has a viscosity at 25° C. equal to or greater than about 80 cps or is a solid and has a dielectric constant equal to or greater than about 5 may have a viscosity at 50° C. equal to or greater than about 10 cps or be a solid.

In an embodiment, (B2) the compound which has a viscosity at 25° C. equal to or greater than about 80 cps or is a solid and has a dielectric constant equal to or greater than about 5 may include a compound represented by any one of Formulae 2-1 to 2-7:

[Formula 2-1]

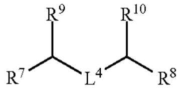

-continued

[Formula 2-2]

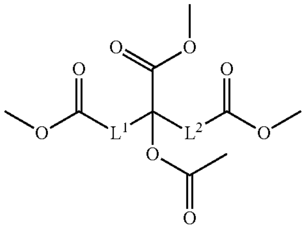

[Formula 2-3]

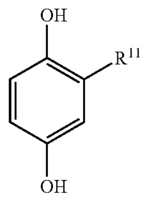

[Formula 2-4]

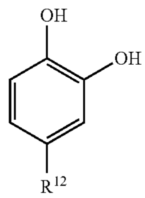

[Formula 2-5]

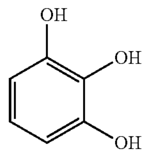

[Formula 2-6]

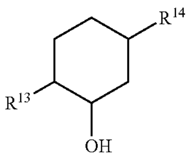

[Formula 2-7]

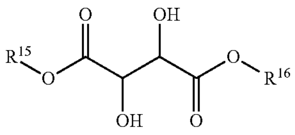

In Formulae 2-1 to 2-7, $R^7$, $R^8$, and $R^{11}$ to $R^{16}$ may each independently be a substituted or unsubstituted C1 to C20 alkyl group, $R^9$ and $R^{10}$ may each independently be a C1 to C20 alkyl group substituted with a hydroxyl group, and $L^1$, $L^2$, and $L^4$ may each independently be a substituted or unsubstituted C1 to C20 alkylene group.

In an embodiment, (B3) the compound which has a viscosity at 25° C. equal to or greater than about 20 cps or is a solid and has a dielectric constant of less than about 5 may have a viscosity at 50° C. equal to or greater than about 5 cps.

In an embodiment, (B3) the compound which has a viscosity at 25° C. equal to or greater than about 20 cps or is a solid and has a dielectric constant of less than about 5 may include a compound represented by any one of Formulae 3-1 to 3-3:

[Formula 3-1]

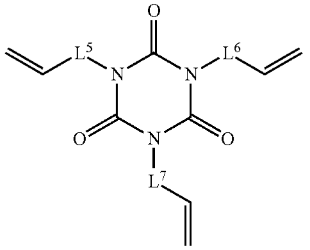

[Formula 3-2]

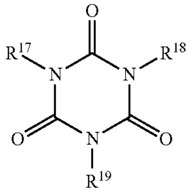

[Formula 3-3]

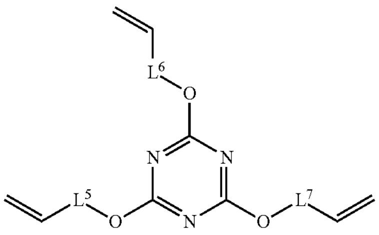

In Formulae 3-1 to 3-3, $R^{17}$ to $R^{19}$ may each independently be a substituted or unsubstituted C1 to C10 alkyl group, and $L^5$ to $L^7$ may each independently be a substituted or unsubstituted C1 to C20 alkylene group.

In an embodiment, (B4) the compound which has a viscosity at 25° C. equal to or less than about 12 cps or is a solid and has a dielectric constant in a range of about 4 to about 7.5 may have a viscosity at 50° C. equal to or greater than about 1 cps.

In an embodiment, (B4) the compound which has a viscosity at 25° C. equal to or less than about 12 cps or is a solid and has a dielectric constant in a range of about 4 to about 7.5 may include a compound represented by any one of Formulae 4-1 to 4-3:

[Formula 4-1]

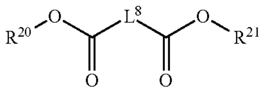

[Formula 4-2]

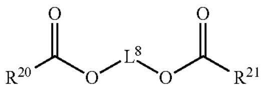

[Formula 4-3]

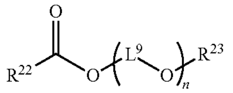

In Formulae 4-1 to 4-3, $R^{20}$ to $R^{23}$ may each independently be a substituted or unsubstituted C1 to C10 alkyl group, and $L^8$ and $L^9$ may each independently be a substituted or unsubstituted C1 to C20 alkylene group.

In an embodiment, the semiconductor nanorod may have a diameter in a range of about 300 nm to about 900 nm.

In an embodiment, the semiconductor nanorod may have a length in a range of about 3.5 μm to about 5 μm.

In an embodiment, the semiconductor nanorod may include a GaN-based compound, an InGaN-based compound, or a combination thereof.

In an embodiment, the semiconductor nanorod may have a surface coated with a metal oxide.

In an embodiment, the metal oxide may include alumina, silica, or a combination thereof.

In an embodiment, an amount of the semiconductor nanorod may be in a range of about 0.01 wt % to about 10 wt % with respect to the total amount of the ink composition.

In an embodiment, the ink composition may further include malonic acid, 3-amino-1,2-propanediol, a silane-based coupling agent, a leveling agent, a fluorine-based surfactant, or a combination thereof.

An embodiment provides a film which may be manufactured using the ink composition.

An embodiment provides an electrophoretic display device which may include the film.

It is to be understood that the embodiments above are described in a generic and explanatory sense only and not for the purpose of limitation, and the disclosure is not limited to the embodiments described above.

BRIEF DESCRIPTION OF THE DRAWING(S)

The accompanying drawings are included to provide a further understanding of the embodiments, and are incorporated in and constitute a part of this specification.

The drawings illustrate embodiments of the disclosure and principles thereof. The above and other aspects and features of the disclosure will become more apparent by describing in detail embodiments thereof with reference to the accompanying drawings, in which:

The FIGURE is a schematic cross-sectional view of a semiconductor nanorod used in an ink composition according to an embodiment.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like reference numbers and reference characters refer to like elements throughout.

In the specification, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the specification, when an element is "directly on," "directly connected to," or "directly coupled to" another element, there are no intervening elements present. For example, "directly on" may mean that two layers or two elements are disposed without an additional element such as an adhesion element therebetween.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group consisting of" for the purpose of its meaning and interpretation. For example, "at least one of A, B, and C" may be understood to mean A only, B only, C only, or any combination of two or more of A, B, and C, such as ABC, ACC, BC, or CC. When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, ±10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

In the specification, unless defined otherwise, the term "alkyl group" may be a C1 to C20 alkyl group, the term "alkenyl group" may be a C2 to C20 alkenyl group, the term "cycloalkenyl group" may be a C3 to C20 cycloalkenyl group, the term "heterocycloalkenyl group" may be a C3 to C20 heterocycloalkenyl group, the term "aryl group" may be a C6 to C20 aryl group, the term "arylalkyl group" may be a C6 to C20 arylalkyl group, the term "alkylene group" may be a C1 to C20 alkylene group, the term "arylene group" may be a C6 to C20 arylene group, the term "alkylarylene group" may be a C6 to C20 alkylarylene group, the term "heteroarylene group" may be a C3 to C20 heteroarylene group, and the term "alkoxylene group" may be a C1 to C20 alkoxylene group.

In the specification, unless defined otherwise, the term "substituted" may refer to where at least one hydrogen atom is replaced by a substituent that is a halogen atom (F, Cl, Br, I), a hydroxyl group, a C1 to C20 alkoxy group, a nitro group, a cyano group, an amine group, an imino group, an azido group, an amidino group, a hydrazine group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

In the specification, unless defined otherwise, the term "hetero" may refer to inclusion of at least one heteroatom of N, O, S, and P in a chemical formula.

In the specification, unless defined otherwise, the term "(meth)acrylate" may be acrylate or methacrylate, and the term "(meth)acryl-based" may be acryl-based or methacryl-based.

In the specification, unless defined otherwise, the term "combination" may refer to a mixture or copolymerization.

In the specification, unless defined otherwise, in a formula, the case in which a chemical bond is not drawn in a position where the chemical bond should be drawn may mean that a hydrogen atom is bonded to the position.

In the specification, a semiconductor nanorod may be a rod-shaped semiconductor having a nano-sized diameter.

In the specification, unless defined otherwise, the symbol "*" may refer to a part linked to the same or different atom or to a chemical formula.

In embodiments, the ink composition may include: (A) a semiconductor nanorod; and (B) a dispersion medium, wherein the dispersion medium may include: (B1) a compound which has a viscosity at 25° C. equal to or less than about 70 cps and has a dielectric constant equal to or greater than about 5; (B2) a compound which has a viscosity at 25° C. equal to or greater than about 80 cps or is a solid and has a dielectric constant equal to or greater than about 5; (B3) a compound which has a viscosity at 25° C. equal to or greater than about 20 cps or is a solid and has a dielectric constant of less than about 5; and (B4) a compound which has a viscosity at 25° C. equal to or less than about 12 cps or is a solid and has a dielectric constant in a range of about 4 to about 7.5.

Current studies are directed to various concepts having effects of improving energy efficiency and preventing efficiency drop of conventional LED, such as a micro LED and a mini LED. Among them, alignment of InGaN-based nanorod LEDs using an electric field (electrophoresis) is attracting attention as a method of dramatically reducing the cost of a complicated and expensive process such as the micro LED and the mini LED.

However, since organic solvents used in conventional displays and electronic materials (PGMEA, GBL, PGME, ethyl acetate, IPA, diethylene glycol monophenyl ether, and the like) have low viscosity, inorganic nanorod particles having high density settle too rapidly and may agglomerate, and since the organic solvents rapidly volatilize, alignment properties may be deteriorated when the solvent is dried after dielectrophoresis. Therefore, in order to develop an ink composition including the inorganic nanorod (semiconductor nanorod), a dispersion medium with high viscosity to improve the sedimentation stability of the nanorod, a high boiling point and good electrophoretic properties are required An ink composition according to embodiments may include the four types of compounds ((B1) to (B4)) in a dispersion medium which is used with the semiconductor nanorod, thereby controlling the electrophoretic properties (for example, permittivity and electrical conductivity) of the semiconductor nanorod in the ink composition to desired ranges to greatly improve dielectrophoretic alignment properties and controlling viscosity at room temperature to about 15 cps to about 25 cps to allow an inkjet process at room temperature. For example, the ink composition may be added to a conventional high-viscosity ink composition to lower only viscosity to allow an inkjet process at room temperature without changing electrophoretic properties (permittivity, electrical conductivity, and the like), and in this respect, may also function as an additive for lowering viscosity.

Hereinafter, each component will be described in detail.

[(A) Semiconductor Nanorod]

The semiconductor nanorod may include a GaN-based compound, an InGaN-based compound, or a combination thereof, and its surface may be coated with a metal oxide.

Usually about 3 hours are required for dispersion stability of a semiconductor nanorod ink solution (semiconductor nanorod+solvent), and is unduly insufficient to perform a large area inkjet process. In embodiments, the surface of a semiconductor nanorod may be coated with alumina, silica, or a combination thereof to form an insulating layer ($Al_2O_3$ or $SiO_x$), thereby maximizing compatibility with a solvent described later.

In embodiments, the insulating layer coated with the metal oxide may have a thickness in a range of about 40 nm to about 60 nm.

The semiconductor nanorod may include an n-type confinement layer and a p-type confinement layer, and a multi-quantum well active region (MQW active region) may be positioned between the n-type confinement layer and the p-type confinement layer.

In embodiments, the semiconductor nanorod may have a diameter in a range of about 300 nm to about 900 nm. For example, the semiconductor nanorod may have a diameter in a range of about 600 nm to about 800 nm.

In embodiments, the semiconductor nanorod may have a length in a range of about 3.5 μm to about 5 μm.

In embodiments, the semiconductor nanorod may have a density in a range of about 5 $g/cm^3$ to about 6 $g/cm^3$, when it includes an alumina insulating layer.

In embodiments, the semiconductor nanorod may have a mass in a range of about $1\times10^{-13}$ g to about $1\times10^{-11}$ g.

When the semiconductor nanorod has a diameter, a length, and a density and is a type within the parameters as described above, the metal oxide may readily coat the surface of the semiconductor nanorod, and the dispersion stability of the semiconductor nanorod may be maximized.

An amount of the semiconductor nanorod in the ink composition may be in a range of about 0.01 wt % to about 10 wt % with respect to the total weight of the ink composition. For example, the amount of the semiconductor nanorod may be in a range of about 0.01 wt % to about 5 wt % with respect to the total weight of the ink composition. For example, the amount of the semiconductor nanorod may be in a range of about 0.01 parts by weight to about 0.5 parts by weight with respect to 100 parts by weight of the solvent in the ink composition. For example, the amount of the semiconductor nanorod may be in a range of about 0.01 parts by weight to about 0.1 parts by weight with respect to 100 parts by weight of the solvent in the ink composition.

When the amount of semiconductor nanorod satisfies the any of the above ranges, dispersibility in the ink composition may be improved, and the manufactured pattern may have excellent brightness.

[(B) Dispersion Medium]

The ink composition according to an embodiment may include four compounds:

(B1) a compound which has a viscosity at 25° C. equal to or less than about 70 cps and has a dielectric constant equal to or greater than about 5, (B2) a compound which has a viscosity at 25° C. equal to or greater than about 80 cps or is a solid and has a dielectric constant equal to or greater than about 5, (B3) a compound which has a viscosity at 25° C. equal to or greater than about 20 cps or is a solid and has a dielectric constant of less than about 5, and (B4) a compound which has a viscosity at 25° C. equal to or less than about 12 cps or is a solid and has a dielectric constant in a range of about 4 to about 7.5.

Recently, the need for a nano-scale ultra-small LEDs has increased, and there have been attempts to manufacture a nano-scale GaN-based compound semiconductor or InGaN-based compound semiconductor into rods. However, the nanorod itself has greatly decreased dispersion stability in a dispersion medium (or polymerizable compound), and there has been no technology which may improve dispersion stability in the dispersion medium (or polymerizable compound) of a semiconductor nanorod.

Since organic solvents which are used in conventional displays and electron materials, such as propylene glycol monomethyl ether acetate (PEGMEA), γ-butyrolactone (GBL), polyethylene glycol methyl ether (PGME), ethyl acetate, isopropyl alcohol (IPA), and diethylene glycol monophenyl ether (DGPE) have low viscosity, inorganic nanorod particles having high density may settle too rapidly and dielectrophoretic properties may be poor. Those organic solvents also may have a low boiling point and thus are inappropriate for an inkjet process. Therefore, as described above, in order to develop an ink composition for an electrophoretic display device including the inorganic nanorod (semiconductor nanorod), it is preferred to use a dispersion medium which may impart sedimentation stability to the nanorod.

In embodiments, in order to impart sedimentation stability to the nanorod and to improve storage stability, the viscosity of the dispersion medium at room temperature should be high and permittivity and electrical conductivity should match well so that dielectrophoretic properties are excellent.

When nanorods in the ink composition are aligned using an AC electric field, electrophoresis and dielectrophoresis occur simultaneously, so that it may be expected that the particles are aligned in a desired direction (biased alignment) at a desired position (center alignment) on a substrate. Electrophoresis and dielectrophoresis are greatly affected by the permittivity and the electrical conductivity of the nanorod and the solvent. Since the electrical properties of the nanorod are almost similar, the alignment properties of the nanorod which is ink-jetted depending on the electrophoretic properties of the dispersion medium in which the nanorods are dispersed may be determined.

However, a conventional material, for example, diethylene glycol monophenyl ether (DGPE) shows a permittivity of 9.4 and an electrical conductivity of 2.0 μS/m at 25° C., and in this case, the alignment properties were shown as a center alignment degree of about 85% and a biased alignment degree of about 74%. However, by applying triethyl citrate which has a lower permittivity (permittivity at 25° C. of 8.3) and a larger electrical conductivity (electrical conductivity at 25° C. of 5.7 μS/m), the center alignment degree may be improved, but the biased alignment degree may be greatly decreased.

A dispersion medium according to embodiments may have a high boiling point (for example, a boiling point equal to or greater than about 270° C.) to allow an inkjet process, and may have electrophoretic properties (for example, permittivity, electrical conductivity, and the like) in a specific area and may be used as an additive which lowers the viscosity of the ink composition alone or with the addition to a conventional high-viscosity ink composition, by mixing the four compounds. The ink composition in which the semiconductor nanorod described above is dispersed in the dispersion medium may have an excellent dielectrophoretic alignment rate.

In embodiments, the dispersion medium may include, with respect to a total amount of the dispersion medium:

- about 10 wt % to about 30 wt % of (B1) the compound which has a viscosity at 25° C. equal to or less than about 70 cps and has a dielectric constant equal to or greater than about 5;
- about 20 wt % to about 40 wt % of (B2) the compound which has a viscosity at 25° C. equal to or greater than about 80 cps or is a solid and has a dielectric constant equal to or greater than about 5;
- about 10 wt % to about 30 wt % of (B3) the compound which has a viscosity at 25° C. equal to or greater than about 20 cps or is a solid and has a dielectric constant of less than about 5; and
- about 20 wt % to about 50 wt % of (B4) the compound which has a viscosity at 25° C. equal to or less than about 12 cps or is a solid and has a dielectric constant in a range of about 4 to about 7.5.

When the content range of each of the four compounds satisfies the above ranges in the dispersion medium which is a mixture of the four compounds, the ink composition may have a viscosity at which an inkjet process is allowed at room temperature, may also have a dielectric constant and electrical conductivity which are controllable to desired regions, and thus, may achieve high dielectrophoretic alignment rate.

In embodiments, (B1) the compound which has a viscosity at 25° C. equal to or less than about 70 cps and has a dielectric constant equal to or greater than about 5 may have a viscosity at 50° C. equal to or less than about 50 cps.

In embodiments, (B1) the compound which has a viscosity at 25° C. equal to or less than about 70 cps and has a dielectric constant equal to or greater than about 5 may include a compound represented by any one of Formulae 1-1 to 1-5, but embodiments are not limited thereto:

[Formula 1-1]

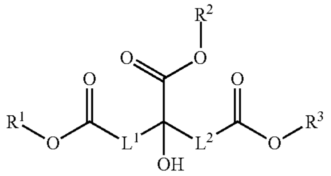

[Formula 1-2]

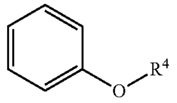

[Formula 1-3]

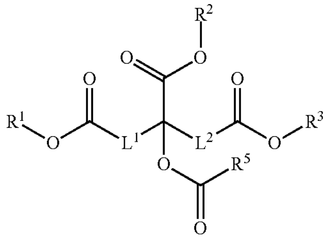

[Formula 1-4]

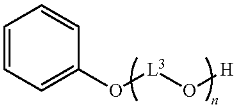

[Formula 1-5]

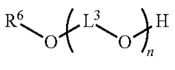

In Formulae 1-1 to 1-5, $R^1$ to $R^3$ and $R^6$ may each independently be a substituted or unsubstituted C1 to C20 alkyl group, $R^4$ may be a C1 to C20 alkyl group substituted with a hydroxyl group, $R^5$ may be a substituted or unsubstituted C2 to C20 alkyl group, $L^1$ to $L^3$ may each independently be a substituted or unsubstituted C1 to C20 alkylene group, and n may be an integer from 1 to 10.

In embodiments, (B1) the compound which has a viscosity at 25° C. equal to or less than about 70 cps and has a dielectric constant equal to or greater than about 5 may be triethyl citrate, propylene glycol phenyl ether, triethyl 2-acetyl citrate, diethylene glycol monophenyl ether, triethylene glycol monobutyl ether, or the like, as shown in Table 1, but embodiments are not limited thereto.

TABLE 1

| | Components of dispersion medium | Viscosity at 25° C. | Viscosity at 50° C. | Dielectric constant |
|---|---|---|---|---|
| B1 | Triethyl citrate | 30 | 9.7 | 11 |
| | Propylene glycol phenyl ether | 26.1 | 4.3 | 8.5 |
| | Triethyl 2-acetyl citrate | 43.1 | 12.3 | 8.4 |
| | Diethylene glycol monophenyl ether | 33 | 9.6 | 11.2 |

TABLE 1-continued

| Components of dispersion medium | Viscosity at 25° C. | Viscosity at 50° C. | Dielectric constant |
|---|---|---|---|
| Triethylene glycol monobutyl ether | 8.5 | 4 | 9.8 |

In embodiments, (B2) the compound which has a viscosity at 25° C. equal to or greater than about 80 cps or is a solid and has a dielectric constant equal to or greater than about 5 may have a viscosity at 50° C. equal to or greater than about 10 cps or be a solid.

In embodiments, (B2) the compound which has a viscosity at 25° C. equal to or greater than about 80 cps or is a solid and has a dielectric constant equal to or greater than about 5 may include a compound represented by any one of Formulae 2-1 to 2-7, but embodiments are not limited thereto:

[Formula 2-1]

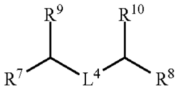

[Formula 2-2]

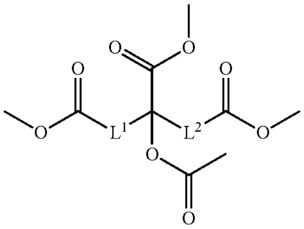

[Formula 2-3]

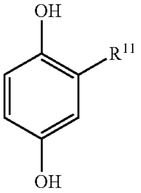

[Formula 2-4]

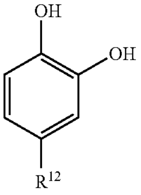

[Formula 2-5]

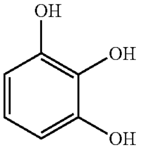

[Formula 2-6]

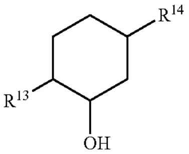

-continued

[Formula 2-7]

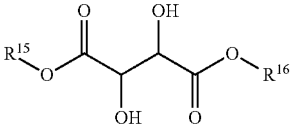

In Formulae 2-1 to 2-7, $R^7$, $R^8$, and $R^{11}$ to $R^{16}$ may each independently be a substituted or unsubstituted C1 to C20 alkyl group, $R^9$ and $R^{10}$ may each independently be a C1 to C20 alkyl group substituted with a hydroxyl group, and $L^1$, $L^2$, and $L^4$ may each independently be a substituted or unsubstituted C1 to C20 alkylene group.

In embodiments, (B2) the compound which has a viscosity at 25° C. equal to or greater than about 80 cps or is a solid and has a dielectric constant equal to or greater than about 5 may be 2,4-diethyl-1,5-pentanediol, trimethyl 2-acetyl citrate, methyl hydroquinone, t-butyl catechol, pyrogallol, menthol, L-diethyl tartrate, or the like, as shown in Table 2, but embodiments are not limited thereto.

TABLE 2

| | Components of dispersion medium | Viscosity at 25° C. | Viscosity at 50° C. | Dielectric constant |
|---|---|---|---|---|
| B2 | 2,4-Diethyl-1,5-pentanediol | 1023 | 133 | 19.4 |
| | Trimethyl 2-acetyl citrate | 354 | 43.4 | 9.6 |
| | Methyl hydroquinone | solid | solid | — |
| | tert-Butyl catechol | solid | solid | — |
| | Pyrogallol | solid | solid | — |
| | Menthol | solid | 10.2 | — |
| | L-Diethyl tartrate | 127 | 20.9 | 10.7 |

In embodiments, (B3) the compound which has a viscosity at 25° C. equal to or greater than about 20 cps or is a solid and has a dielectric constant of less than about 5 may have a viscosity at 50° C. equal to or greater than about 5 cps.

In embodiments, (B3) the compound which has a viscosity at 25° C. equal to or greater than about 20 cps or is a solid and has a dielectric constant of less than about 5 may include a compound represented by any one of Formulae 3-1 to 3-3, but embodiments are not limited thereto:

[Formula 3-1]

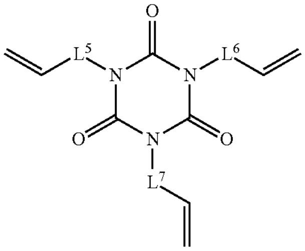

[Formula 3-2]

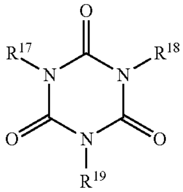

-continued

[Formula 3-3]

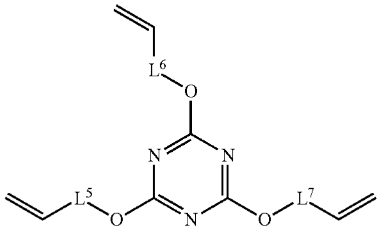

In Formulae 3-1 to 3-3, $R^{17}$ to $R^{19}$ may each independently be a substituted or unsubstituted C1 to C10 alkyl group, and $L^5$ to $L^7$ may each independently be a substituted or unsubstituted C1 to C20 alkylene group.

In embodiments, (B3) the compound which has a viscosity at 25° C. equal to or greater than about 20 cps or is a solid and has a dielectric constant of less than about 5 may be triallyl isocyanurate, tris(n-propyl) isocyanurate, triallyl cyanurate, or the like, as shown in Table 3, but embodiments are not limited thereto.

TABLE 3

| Components of dispersion medium | | Viscosity at 25° C. | Viscosity at 50° C. | Dielectric constant |
|---|---|---|---|---|
| B3 | Triallyl isocyanurate | 144 | 23.4 | 2.7 |
| | Tris(n-propyl) isocyanurate | 132 | 21.2 | 2.7 |
| | Triallyl cyanurate | solid | 8.5 | 2.9 |

In embodiments, (B4) the compound which has a viscosity at 25° C. equal to or less than about 12 cps or is a solid and has a dielectric constant in a range of about 4 to about 7.5 may have a viscosity at 50° C. equal to or greater than about 1 cps.

In embodiments, (B4) the compound which has a viscosity at 25° C. equal to or less than about 12 cps or is a solid and has a dielectric constant in a range of about 4 to about 7.5 may include a compound represented by any one of Formulae 4-1 to 4-3, but embodiments are not limited thereto:

[Formula 4-1]

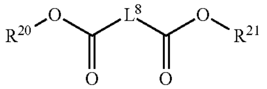

[Formula 4-2]

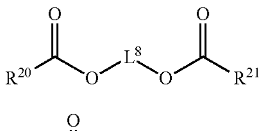

[Formula 4-3]

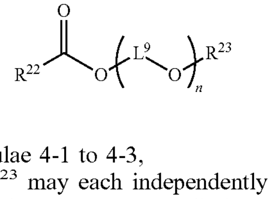

In Formulae 4-1 to 4-3, $R^{20}$ to $R^{23}$ may each independently be a substituted or unsubstituted C1 to C10 alkyl group, and $L^8$ and $L^9$ may each independently be a substituted or unsubstituted C1 to C20 alkylene group.

In embodiments, (B4) the compound which has a viscosity at 25° C. equal to or less than about 12 cps or is a solid and has a dielectric constant in a range of about 4 to about 7.5 may be dimethyl sebacate, 1,8-diacetoxyoctane, or the like, as shown in Table 4, but embodiments are not limited thereto:

TABLE 4

| Components of dispersion medium | | Viscosity at 25° C. | Viscosity at 50° C. | Dielectric constant |
|---|---|---|---|---|
| B4 | Dimethyl sebacate | Solid (mp 38° C.) | 1.4 | 4.92 |
| | 1,8-Diacetoxyoctane | 5.7 | 1.5 | 5.01 |
| | Triethylene glycol monobutyl ether acetate | 5.0 | 1.2 | 5.68 |

In embodiments, the dispersion medium may be a mixture of any one of the compounds corresponding to (B1), any one of the compounds corresponding to (B2), any one of the compounds corresponding to (B3), and any one of the compounds corresponding to (B4). Even in the case in which the dispersion medium is a mixture of the four compounds, when the four compounds are formed of, for example, any one of the compounds corresponding to (B1), any one of the compounds corresponding to (B2), and any two of the compounds corresponding to (B3), ink-jetting at room temperature described above may not be allowed, or a high dielectrophoretic alignment rate may not be achieved.

In embodiments, an amount of dispersion medium may be in a range of about 15 wt % to about 99.99 wt % with respect to the total amount of the ink composition. For example, the amount of dispersion medium may be in a range of about 20 wt % to about 99.7 wt % with respect to the total amount of the ink composition.

[Polymerizable Monomer]

The ink composition according to an embodiment may further include a polymerizable compound. The polymerizable compound may be a mixture of monomers and/or oligomers, which are used in a curable compositions of the related art.

In embodiments, the polymerizable compound may be a polymerizable monomer having a carbon-carbon double bond at a terminus of the monomer.

In embodiments, the polymerizable compound may be a polymerizable monomer having at least one of a functional group represented by Formula A-1 and a functional group represented by Formula A-2:

[Formula A-1]

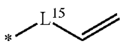

[Formula A-2]

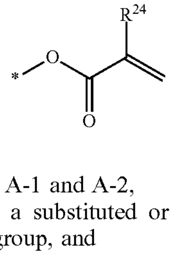

In Formulae A-1 and A-2, $L^{15}$ may be a substituted or unsubstituted C1 to C20 alkylene group, and $R^{24}$ may be a hydrogen atom or a substituted or unsubstituted C1 to C20 alkyl group.

The polymerizable compound may include a carbon-carbon double bond, for example, at least one of the functional group represented by Formula A-1 and the functional group represented by Formula A-2 at a terminus of the polymerizable compound, thereby forming a crosslinked structure with the surface-modified compound. The cross-linked body formed as such may further improve dispersion stability of the semiconductor nanorod by further increasing a steric hindrance effect.

In embodiments, the polymerizable compound including one or more of the functional groups represented by Formula A-1 at a terminus of the polymerizable compound may include divinyl benzene, triallyl cyanurate, triallyl isocyanurate, triallyl trimellitate, triallyl phosphate, triallyl phosphite, triallyl triazine, diallyl phthalate, or a combination thereof, or the like, but embodiments are not limited thereto.

In embodiments, the polymerizable compound including one or more of the functional groups represented by Formula A-2 at a terminus of the polymerizable compound may include ethylene glycol diacrylate, triethylene glycol diacrylate, 1,4-butanediol diacrylate, 1,6-hexanediol diacrylate, neopentylglycol diacrylate, pentaerythritol diacrylate, pentaerythritol triacrylate, dipentaerythritol diacrylate, dipentaerythritol triacrylate, dipentaerythritol pentaacrylate, pentaerythritol hexaacrylate, bisphenol A diacrylate, trimethylolpropane triacrylate, novolac epoxy acrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, polyfunctional epoxy(meth)acrylate, polyfunctional urethane(meth)acrylate, KAYARAD DPCA-20, KAYARAD DPCA-30, KAYARAD DPCA-60, KAYARAD DPCA-120, KAYARAD DPEA-12 (the KAYARAD family of compounds are available from Nippon Kayaku Co., Ltd.), or a combination thereof, or the like, but embodiments are not limited thereto.

The polymerizable compound may be used after being treated with an acid anhydride to impart better developability.

[Polymerization Initiator]

The ink composition according to an embodiment may further include a polymerization initiator, for example, a photopolymerization initiator, a thermal polymerization initiator, or a combination thereof.

The photopolymerization initiator may be an initiator which is used in a curable composition of the related art. The examples of photopolymerization initiator may include acetophenone-based compounds, benzophenone-based compounds, thioxanthone-based compounds, benzoin-based compounds, triazine-based compounds, oxime-based compounds, aminoketone-based compounds, and the like, but embodiments are not limited thereto.

Examples of the acetophenone-based compound may include 2,2'-diethoxy acetophenone, 2,2'-dibutoxy acetophenone, 2-hydroxy-2-methylpropiophenone, p-t-butyltrichloroacetophenone, p-t-butyldichloroacetophenone, 4-chloroacetophenone, 2,2'-dichloro-4-phenoxyacetophenone, 2-methyl-1-(4-(methylthio)phenyl)-2-morpholinopropane-1-one, 2-benzyl-2-dimethylamino-1-(4-morpholinophenyl)-butane-1-one, and the like.

Examples of the benzophenone-based compound may include benzophenone, benzoyl benzoic acid, methyl benzoyl benzoic acid, 4-phenyl benzophenone, hydroxybenzophenone, acrylated benzophenone, 4,4'-bis(dimethylamino) benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like.

Examples of the thioxanthone-based compound may include thioxanthone, 2-methylthioxanthone, isopropyl thioxanthone, 2,4-diethyl thioxanthone, 2,4-diisopropyl thioxanthone, 2-chlorothioxanthone, and the like.

Examples of the benzoin-based compound may include benzoin, benzoin methyl ether, benzoin ethyl ether, benzoin isopropyl ether, benzoin isobutyl ether, benzyl dimethyl ketal, and the like.

Examples of the triazine-based compound may include 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl-4,6-bis(trichloromethyl)-s-triazine, bis(trichloromethyl)-6-styryl-s-triazine, 2-(naphto-1-yl)-4,6-bis(trichloromethyl)-s-triazine, 2-(4-methoxynaphto-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

Examples of the oxime-based compound may include o-acyloxime-based compounds, 2-(o-benzoyloxime)-1-[4-(phenylthio)phenyl]-1,2-octanedione, 1-(0-acetyloxime)-1-[9-ethyl-6-(2-methylbenzoyl)-9H-carbazol-3-yl]ethanone, o-ethoxycarbonyl-α-oxyamino-1-phenylpropane-1-one, and the like. Examples of the o-acyloxime-based compound may include 1,2-octanedione, 2-dimethylamino-2-(4-methylbenzyl)-1-(4-morpholin-4-yl-phenyl)-butan-1-one, 1-(4-phenylsulfanylphenyl)-butane-1,2-dione-2-oxime-o-benzoate, 1-(4-phenylsulfanylphenyl)-octane-1,2-dione-2-oxime-o-benzoate, 1-(4-phenylsulfanylphenyl)-octane-1-oneoxime-o-acetate, 1-(4-phenylsulfanylphenyl)-butane-1-oneoxime-o-acetate, and the like.

Examples of the aminoketone-based compound may include 2-benzyl-2-dimethylamino-1-(4-morpholinophenyl)-butanone-1 and the like.

Examples of the photopolymerization initiator may include carbazole-based compounds, diketone compounds, sulfonium borate-based compounds, diazo-based compounds, imidazole-based compounds, non-imidazole-based compounds, and the like.

The photopolymerization initiator may be used with a photosensitizer which absorbs light to achieve an excited state and transfers the energy to cause a chemical reaction.

Examples of the photosensitizer may include tetraethylene glycol bis-3-mercapto propionate, pentaerythritol tetrakis-3-mercaptopropionate, dipentaerythritol tetrakis-3-mercapto propionate, and the like.

Examples of the thermal polymerization initiator may include peroxide. Examples of peroxide may include benzoyl peroxide, dibenzoyl peroxide, lauryl peroxide, dilauryl peroxide, di-tert-butyl peroxide, cyclohexane peroxide, methyl ethyl ketone peroxide, hydroperoxide (e.g., tert-butyl hydroperoxide, cumene hydroperoxide), dicyclohexyl peroxydicarbonate, 2,2-azo-bis(isobutyronitrile), t-butyl perbenzoate, and the like. Examples of peroxide may also include 2,2'-azobis-2-methylpropionitrile and the like. However, embodiments are not limited thereto, and any compounds which are used in the related art may be used.

An amount of the polymerization initiator may be in a range of about 1 wt % to about 5 wt % with respect to the total amount of the solid content forming the ink composition. For example, the amount of the polymerization initiator may be in a range of about 2 wt % to about 4 wt % with respect to the total amount of the solid content forming the ink composition. When the amount of the polymerization initiator satisfies the any of the above ranges, excellent reliability may be obtained since curing may occur sufficiently during light exposure or thermal curing.

[Other Additives]

The ink composition according to an embodiment may further include a polymerization inhibitor such as hydroquinone-based compounds, catechol-based compounds, or a combination thereof. When the ink composition further includes the hydroquinone-based compounds, the catechol-based compounds, or a combination thereof, crosslinking at room temperature may be prevented or reduced during light exposure, after printing (coating) the ink composition.

Examples of the hydroquinone-based compound, the catechol-based compound, or a combination thereof may include hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis(1,1,3,3-tetramethylbutyl) hydroquinone, catechol, t-butyl catechol, 4-methoxyphenol, pyrogalloll, 2,6-di-t-butyl-4-methylphenol, 2-naphthol, tris(N-hydroxy-N-nitrosophenylaminato-O,O')aluminum, and a combination thereof, but embodiments are not limited thereto.

The hydroquinone-based compound, the catechol-based compound, or a combination thereof may be used in a dispersion form. An amount of the polymerization inhibitor in the dispersion form may be in a range of about 0.001 wt % to about 1 wt % with respect to the total amount of the ink composition. For example, the amount of the polymerization inhibitor in the dispersion form may be in a range of about 0.01 wt % to about 0.1 wt % with respect to the total amount of the ink composition. When the amount of the stabilizer satisfies any of the above ranges, a room temperature aging problem may be solved, and simultaneously, sensitivity deterioration and a surface delamination phenomenon may be prevented or reduced.

In embodiments, the ink composition may further include malonic acid, 3-amino-1,2-propanediol, a silane-based coupling agent, a leveling agent, a fluorine-based surfactant, or a combination thereof, in addition to the polymerization inhibitor.

In embodiments, the ink composition may further include a silane-based coupling agent having a reactive substituent such as a vinyl group, a carboxyl group, a methacryloxy group, an isocyanate group, and an epoxy group for improving adhesiveness to a substrate.

Examples of the silane-based coupling agent may include trimethoxysilyl benzoic acid, γ-methacryloxypropyl trimethoxysilane, vinyl triacetoxysilane, vinyl trimethoxysilane, γ-isocyanate propyl triethoxysilane, γ-glycidoxypropyl trimethoxysilane, β-epoxycyclohexyl)ethyltrimethoxysilane, and the like, and these may be used alone or in combination of two or more.

An amount of the silane-based coupling agent may be in a range of about 0.01 parts by weight to about 10 parts by weight with respect to 100 parts by weight of the ink composition. When an amount of the silane-based coupling agent satisfies the above range, adhesiveness, storage properties, and the like may be excellent.

In embodiments, the ink composition may further include a surfactant, for example, a fluorine-based surfactant for improving coatability and preventing defects in production, if necessary.

The fluorine-based surfactant may be fluorine-based surfactants which are commercially available in the name of BM-1000®, BM-1100®, and the like (available from BM Chemie); Mega Pack F 142D®, Mega Pack F 172®, Mega Pack F 173®, Mega Pack F 183®, and the like (available from Dai Nippon Ink Corporation); Fluorad FC-135®, Fluorad FC-170C®, Fluorad FC-430®, Fluorad FC-431®, and the like (available from Sumitomo 3M Ltd.); Saflon S-112®, Saflon S-113®, Saflon S-131®, Saflon S-141®, Saflon S-145®, and the like (available from Asahi Glass Co., Ltd.); SH-28PA®, SH-190®, SH-193®, SZ-6032®, SF-8428®, and the like (available from Toray Silicone Co., Ltd.); F-482, F-484, F-478, F-554, and the like (available from DIC corporation); and the like.

An amount of the fluorine-based surfactant may be in a range of about 0.001 parts by weight to about 5 parts by weight with respect to 100 parts by weight of the ink composition. When the amount of the fluorine-based surfactant satisfies the above range, coating uniformity may be secured, stains may not occur, and wettability to a glass substrate may be excellent.

Other additives such as an antioxidant and a stabilizer may be further added at an amount within a range where the physical properties are not deteriorated.

Embodiments provide a film using the ink composition.

Embodiments provide a display device including the film. For example, the display device may be an electrophoretic display device.

Hereinafter, the ink composition according to embodiments will be described with reference to the Examples and Comparative Examples. The embodiments described below are only examples to assist in understanding the embodiments, and the scope of the embodiments is not limited thereto.

(Preparation of Ink Composition)

Examples 1 to 9 and Comparative Examples 1 to 3

40 ml of stearic acid (1.5 mM) was reacted at room temperature for 24 hours in an InGaN wafer (4 inch) which was nanoroad patterned. The wafer was soaked for 5 minutes in 50 ml of acetone to remove excessive stearic acid, and the surface of the wafer was rinsed using an additional 40 ml of acetone. The cleaned wafer was added to a 27 kW bath type sonicator with 35 ml of GBL, and rods were separated from the surface of the water for 5 minutes using sonication. The separated rods were added to a centrifuge-only FALCON tube, and 10 ml of GBL was further added to further clean the rods on the surface of the bath. Centrifugation was performed at 4000 rpm for 10 minutes, a supernatant was discarded, a precipitate was redispersed in acetone (40 ml), and foreign matter was filtered out using a 10 μm mesh filter. After further centrifugation (4000 rpm, 10 minutes), the precipitate was dried in a drying oven (100° C., 1 hour), the weight was measured, and precipitate was dispersed to be 0.2 w/w %, thereby preparing the ink composition having the composition of Table 5.

Dispersion medium compositions, viscosity at 25° C. of dispersion medium, dielectric constants at 55° C., and electrical conductivity at 55° C. were as shown in Tables 6 and 7.

TABLE 5

| | Content (unit: wt %) |
|---|---|
| (A) InGaN nanorod | 0.2 |
| (B) dispersion medium | 99.8 |

TABLE 6

| Dispersion medium | Example 1 | Example 2 | Example 3 | Example 4 | Example 5 | Example 6 | Example 7 | Example 8 | Example 9 |
|---|---|---|---|---|---|---|---|---|---|
| Viscosity (cps) (@25° C.) | 19 | 19 | 18 | 18 | 18 | 18 | 17 | 17 | 18 |
| Available dielectric constant range (50/50 kHz) (@55° C.) | 4-11 | 4-11 | 4-11 | 4-11 | 4-11 | 4-11 | 4-11 | 4-11 | 4-11 |
| Electrical conductivity (μS/m) (50/50 kHz) (@55° C.) | 0.834/ 0.852 | 0.639/ 0.646 | 0.732/ 0.740 | 0.718/ 0.727 | 0.681/ 0.687 | 0.442/ 0.451 | 0.494/ 0.502 | 0.333/ 0.338 | 0.441/ 0.455 |
| Composition of dispersion medium (wt %) | B1-1 (27.4) B2-1 (24.6) B3-1 (18) B4-1 (30) | B1-1 (27.4) B2-1 (23) B3-1 (19.6) B4-1 (30) | B1-1 (25.4) B2-1 (24.6) B3-1 (18) B4-1 (32) | B1-1 (24.4) B2-1 (24.6) B3-1 (19) B4-1 (32) | B1-1 (23.4) B2-1 (24.6) B3-1 (20) B4-1 (32) | B1-1 (13.8) B2-1 (24.6) B3-1 (21.6) B4-2 (40) | B1-1 (13.8) B2-1 (26.6) B3-1 (19.6) B4-2 (40) | B1-1 (13.8) B2-1 (22.6) B3-1 (23.6) B4-2 (40) | B1-1 (13.8) B2-1 (22.6) B3-1 (23.6) B4-3 (40) |

TABLE 7

| Dispersion medium | Comparative Example 1 | Comparative Example 2 | Comparative Example 3 |
|---|---|---|---|
| Viscosity (cps) (@25° C.) | 33 | 60 | 66 |
| Available dielectric constant range (50/50 kHz) (@55° C.) | 11.2 | 10.4 | 4-11 |
| Electrical conductivity (μS/m) (50/50 kHz) (@55° C.) | 1.538/0.925 | 0.332/0.312 | 0.431/0.443 |
| Composition of dispersion medium(wt %) | Diethylene glycol monophenyl ether (100) | B1-1 (50) + Triethyl 2-acetyl citrate (50) | B1-1 (36) B2-1 (27) + 2,4-Diethyl-1,5-pentanediol (37) |

B1-1: Triethyl citrate

B2-1: L-diethyl tartrate

B3-1: Tris(n-propyl)isocyanurate

B4-1: Dimethyl sebacate

B4-2: 1,8-diacetoxyoctane

B4-3: Triethylene glycol monobutyl ether acetate

[Evaluation: Electrophoretic Properties]

Thin-film gold basic interdigitated linear electrodes (ED-cIDE4-Au, available from Micrux) were coated with the ink compositions of Examples 1 to 9 and Comparative Examples 1 to 3 at 500 μL, respectively, an electric field (25 KHz, ±30 v) was applied, and the electrodes were allowed to stand for 1 minute. The solvent was dried using a hot plate, the number of center alignments (ea) and the number of non-alignments between the electrodes were confirmed using a microscope to evaluate electrophoretic properties. The results are shown in Table 8.

TABLE 8

| | Example 1 | Example 2 | Example 3 | Example 4 | Example 5 | Example 6 |
|---|---|---|---|---|---|---|
| Biased alignment degree (%) | 97 | 99 | 98 | 99 | 98 | 93 |
| Center alignment degree (%) | 97 | 97 | 97 | 95 | 98 | 87 |
| Alignment degree (%) | 95 | 96 | 95 | 94 | 96 | 81 |

| | Example 7 | Example 8 | Example 9 | Comparative Example 1 | Comparative Example 2 | Comparative Example 3 |
|---|---|---|---|---|---|---|
| Center alignment degree (%) | 94 | 91 | 91 | 79 | 80 | 86 |
| Biased alignment degree (%) | 90 | 88 | 90 | 76 | 78 | 93 |
| Alignment degree (%) | 85 | 80 | 84 | 74 | 75 | 79 |

As seen in Tables 6 to 8, Comparative Examples 1 to 3 do not include one or more compounds corresponding to each of (B2), (B3), and/or (B4) in the dispersion medium. Comparative Example 1 only achieved the viscosity, the dielectric constant, and the electrical conductivity of the corresponding dispersion medium, as did Comparative Example 2. Comparative Example 3 allowed adjustment of a dielectric constant at room temperature, but had too high of a viscosity at room temperature. In contrast, in Examples 1 to 9, viscosity at room temperature was adjusted in a range from 10 cps to 30 cps, and simultaneously, electrical conductivity/dielectric constant was adjusted to achieve a high dielectrophoretic alignment rate. Thus, it was confirmed that the ink composition according to an embodiment had significantly improved center alignment degree and biased alignment degree (center alignment degree and biased alignment degree by 88% or more), and thus the ink composition is appropriate for large area coating and panel production.

Embodiments have been disclosed herein, and although terms are employed, they are used and are to be interpreted in a generic and descriptive sense only and not for purposes of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. An ink composition comprising:

a semiconductor nanorod; and a dispersion medium, wherein the dispersion medium includes:

a compound which has a viscosity at 25° C. equal to or less than about 70 cps and has a dielectric constant equal to or greater than about 5 and includes a compound represented by one of Formulae 1-1 to 1-5;

a compound which has a viscosity at 25° C. equal to or greater than about 80 cps or is a solid and has a dielectric constant equal to or greater than about 5 and includes a compound represented by one of Formulae 2-1 to Formula 2-7;

a compound which has a viscosity at 25° C. equal to or greater than about 20 cps or is a solid and has a dielectric constant of less than about 5 and includes a compound represented by one of Formulae 3-1 to Formula 3-3; and a compound which has a viscosity at 25° C. equal to or less than about 12 cps or is a solid and has a dielectric constant in a range of about 4 to about 7.5 and includes a compound represented by one of Formulae 4-1 to Formula 4-3,

[Formula 1-1]

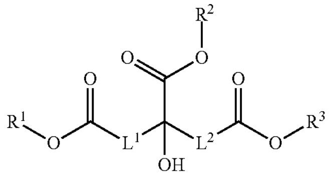

-continued

[Formula 1-2]

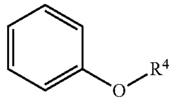

[Formula 1-3]

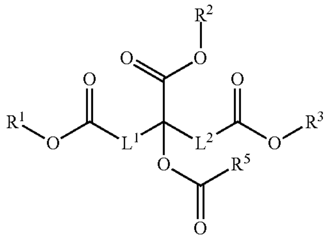

[Formula 1-4]

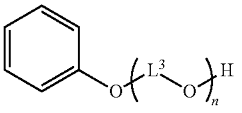

[Formula 1-5]

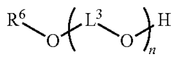

wherein in Formulae 1-1 to 1-5, $R^1$ to $R^3$ and $R^6$ are each independently a substituted or unsubstituted C1 to C20 alkyl group, $R^4$ is a C1 to C20 alkyl group substituted by a hydroxyl group, $R^5$ is a substituted or unsubstituted C2 to C20 alkyl group, $L^1$ to $L^3$ are each independently a substituted or unsubstituted C1 to C20 alkylene group, and n is an integer from 1 to 10,

[Formula 2-1]

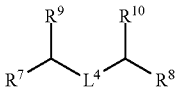

[Formula 2-2]

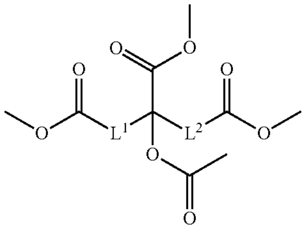

[Formula 2-3]

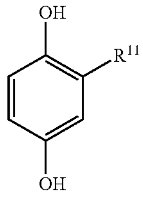

[Formula 2-4]

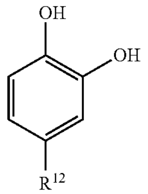

-continued

[Formula 2-5]

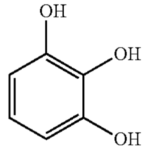

[Formula 2-6]

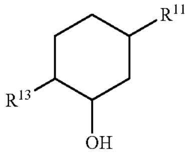

[Formula 2-7]

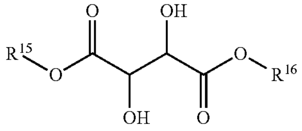

wherein in Formulae 2-1 to 2-7, $R^7$, $R^8$, and $R^{11}$ to $R^{16}$ are each independently a substituted or unsubstituted C1 to C20 alkyl group, $R^9$ and $R^{10}$ are each independently a C1 to C20 alkyl group substituted by a hydroxyl group, and $L^1$, $L^2$ and $L^4$ are each independently a substituted or unsubstituted C1 to C20 alkylene group,

[Formula 3-1]

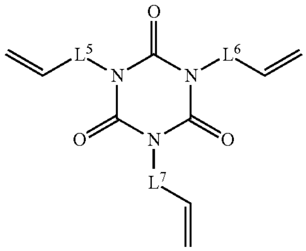

[Formula 3-2]

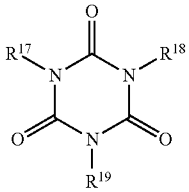

[Formula 3-3]

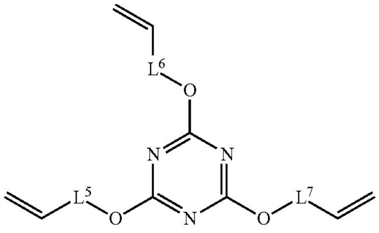

wherein in Formulae 3-1 to 3-3, $R^{17}$ to $R^{19}$ are each independently a substituted or unsubstituted C1 to C10 alkyl group, and $L^5$ to $L^7$ are each independently a substituted or unsubstituted C1 to C20 alkylene group,

[Formula 4-1]

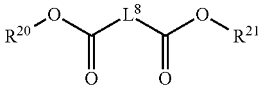

[Formula 4-2]

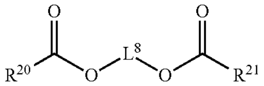

[Formula 4-3]

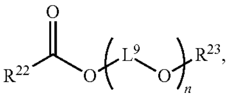

and wherein in Formulae 4-1 to 4-3, $R^{20}$ to $R^{23}$ are each independently of a substituted or unsubstituted C1 to C10 alkyl group, and $L^8$ and $L^9$ are each independently of a substituted or unsubstituted C1 to C20 alkylene group.

2. The ink composition of claim 1, wherein the dispersion medium includes, with respect to a total amount of the dispersion medium:

about 10 wt % to about 30 wt % of the compound which has a viscosity at 25° C. equal to or less than about 70 cps and has a dielectric constant equal to or greater than about 5;

about 20 wt % to about 40 wt % of the compound which has a viscosity at 25° C. equal to or greater than about 80 cps or is a solid and has a dielectric constant equal to or greater than about 5;

about 10 wt % to about 30 wt % of the compound which has a viscosity at 25° C. equal to or greater than about 20 cps or is a solid and has a dielectric constant of less than about 5; and about 20 wt % to about 50 wt % of the compound which has a viscosity at 25° C. equal to or less than about 12 cps or is a solid and has a dielectric constant in a range of about 4 to about 7.5.

3. The ink composition of claim 1, wherein the compound which has a viscosity at 25° C. equal to or less than about 70 cps and has a dielectric constant equal to or greater than about 5 has a viscosity at 50° C. equal to or less than about 50 cps.

4. The ink composition of claim 1, wherein the compound which has a viscosity at 25° C. equal to or greater than about 80 cps or is a solid and has a dielectric constant equal to or greater than about 5 has a viscosity at 50° C. equal to or less than about 10 cps or is a solid.

5. The ink composition of claim 1, wherein the compound which has a viscosity at 25° C. equal to or greater than about 20 cps or is a solid and has a dielectric constant of less than about 5 has a viscosity at 50° C. equal to or greater than about 5 cps.

6. The ink composition of claim 1, wherein the compound which has a viscosity at 25° C. equal to or less than about 12 cps or is a solid and has a dielectric constant in a range of about 4 to about 7.5 has a viscosity at 50° C. equal to or greater than about 1 cps.

7. The ink composition of claim 1, wherein the semiconductor nanorod has a diameter in a range of about 300 nm to about 900 nm.

8. The ink composition of claim 1, wherein the semiconductor nanorod has a length in a range of about 3.5 μm to about 5 μm.

9. The ink composition of claim 1, wherein the semiconductor nanorod includes a GaN-based compound, an InGaN-based compound, or a combination thereof.

10. The ink composition of claim 1, wherein the semiconductor nanorod has a surface coated with a metal oxide.

11. The ink composition of claim 10, wherein the metal oxide includes alumina, silica, or a combination thereof.

12. The ink composition of claim 1, wherein an amount of the semiconductor nanorod is in a range of about 0.01 wt % to about 10 wt % with respect to the total amount of the ink composition.

13. The ink composition of claim 1, further comprising: malonic acid, 3-amino-1,2-propanediol, a silane-based coupling agent, a leveling agent, a fluorine-based surfactant, or a combination thereof.

14. A film manufactured using the ink composition of claim 1.

15. An electrophoretic display device comprising the film of claim 14.

16. An ink composition comprising:
a semiconductor nanorod; and
a dispersion medium, wherein
the dispersion medium includes:
- a compound which has a viscosity at 25° C. equal to or less than about 70 cps and has a dielectric constant equal to or greater than about 5 and includes a compound represented by Formula 1-1;
- a compound which has a viscosity at 25° C. equal to or greater than about 80 cps or is a solid and has a dielectric constant equal to or greater than about 5 and includes a compound represented by Formula 2-7;
- a compound which has a viscosity at 25° C. equal to or greater than about 20 cps or is a solid and has a dielectric constant of less than about 5 and includes a compound represented by Formula 3-2; and
- a compound which has a viscosity at 25° C. equal to or less than about 12 cps or is a solid and has a dielectric constant in a range of about 4 to about 7.5 and includes a compound represented by Formula 4-1,

[Formula 1-1]

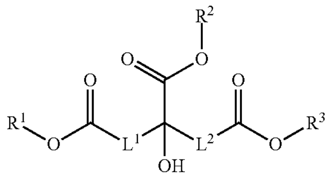

wherein in Formula 1-1,
$R^1$ to $R^3$ are each independently a substituted or unsubstituted C1 to C20 alkyl group, and
$L^1$ to $L^2$ are each independently a substituted or unsubstituted C1 to C20 alkylene group,

[ Formula 2-7]

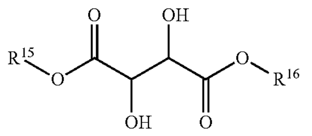

wherein in Formula 2-7,
$R^{15}$ and $R^{16}$ are each independently a substituted or unsubstituted C1 to C20 alkyl group,

[Formula 3-2]

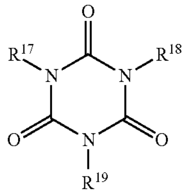

wherein in Formula 3-2,
$R^{17}$ to $R^{19}$ are each independently a substituted or unsubstituted C1 to C10 alkyl group,

[Formula 4-1]

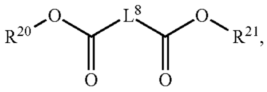
, and
wherein in Formulae 4-1,
$R^{20}$ to $R^{21}$ are each independently of a substituted or unsubstituted C1 to C10 alkyl group, and
$L^8$ is a substituted or unsubstituted C1 to C20 alkylene group.

17. The ink composition of claim 16, wherein an amount of the semiconductor nanorod is in a range of about 0.01 wt % to about 10 wt % with respect to the total amount of the ink composition.

18. The ink composition of claim 16, further comprising: malonic acid, 3-amino-1,2-propanediol, a silane-based coupling agent, a leveling agent, a fluorine-based surfactant, or a combination thereof.

19. A film manufactured using the ink composition of claim 16.

20. An electrophoretic display device comprising the film of claim 19.

* * * * *